Patented Jan. 15, 1952

2,582,425

UNITED STATES PATENT OFFICE 2,582,425

TRIPOLYMER OF A VINYL AROMATIC COMPOUND, A COUMARONE-INDENE FRACTION AND MATERIAL RECOVERED FROM A HYDROCARBON-CATALYST SLUDGE

Edward M. Geiser, Downers Grove, Ill., assignor to Universal Oil Products Company, Chicago, Ill., a corporation of Delaware No Drawing. Application May 18, 1949, Serial No. 94,050

11 Claims. (Cl. 260—80.5)

This invention relates to a process for the production of a predominantly hydrocarbonaceous resinous material soluble in organic solvents and containing residual unsaturation which enables the product to undergo oxidative drying. More specifically, the invention concerns a resinous copolymer composition and a process for its production which comprises copolymerizing a mixture of cyclic, polyolefinic hydrocarbons containing conjugated as well as non-conjugated unsaturation with a vinyl aromatic compound and a coumaroneindene fraction, or in an alternative method for its production, copolymerizing said polyolefinic, cyclic hydrocarbons with either of said vinyl aromatic or coumarone-indene monomers in an initial stage of the process and thereafter reacting the initial product with the remaining monomer to form said resinous copolymer product.

In one of its embodiments, the present invention concerns a process for the production of a resinous material which comprises copolymerizing a mixture of polyolefinic, cyclic hydrocarbons containing conjugated and non-conjugated unsaturation with a vinyl aromatic compound and a coumarone-indene fraction in the presence of an acid-acting copolymerization catalyst.

Another embodiment of the invention relates to a resinous copolymer composition which comprises the copolymerization product of a mixture of polyolefinic, cyclic hydrocarbons containing conjugated and non-conjugated unsaturation with a vinyl aromatic compound and a coumarone-indene fraction.

A more specific embodiment of the invention relates to a process for the production of a resinous copolymer composition which comprises copolymerizing in the presence of an acid-acting catalyst a mixture of reactants consisting of from about 5 to about 60% by weight of polyolefinic cyclic hydrocarbons containing conjugated and non-conjugated unsaturation, from about 5 to about 40% of a vinyl aromatic compound and the remainder an indene-coumarone fraction boiling from about 165° to about 200° C.

One of the primary reactants of the present process which predominantly accounts for the unsaturation of the final resinous product is characterized herein as a mixture of polyolefinic, cyclic hydrocarbons containing conjugated as well as non-conjugated unsaturation formed by a process well recognized by the art as a "conjunct polymerization reaction" and hereinafter described in greater detail. These hydrocarbons, also referred to descriptively as unsaturated conjunct polymers, when prepared and isolated in accordance with procedures designed to retain their highly unsaturated structure, have a cyclopentenyl structure containing on the average of from 2 to 5 alkyl, alkenyl, and alkapolyvenyl substituents in which the olefinic unsaturation of the alkenyl and alkapolyenyl side chains are in conjugation with each other, and/or with the olefinic bond of the cyclopentenyl ring to which they are attached. The total number of olefinic bonds in the molecular structure of the hydrocarbon conjunct polymer molecules may vary from about 2.5 to about 4.5 per molecule (depending upon the molecular weight of the individual hydrocarbons) of which from about 40 to about 70% are in conjugation with each other. These hydrocarbons are relatively active in their ability to copolymerize with other unsaturated monomers as well as other diverse reactants to form products of varying properties.

The highly unsaturated structure of the conjunct polymer hydrocarbons enable them to undergo multiple copolymerization by virtue of the numerous unsaturated hydrocarbon substituents attached to the cyclopentenyl nucleus, the copolymerization being limited only by such factors as steric hindrance, physical admixing of reactants, etc. In many instances, the product may still contain non-copolymerized unsaturation which enables it to undergo oxidative drying when the product is exposed to atmospheric oxygen or other reactions associated with its unsaturated structure. The number of olefinic bonds retained by the present product will ultimately depend upon the extent of the copolymerization, the number of double bonds involved in the reaction, as well as the number of olefinic bonds initally present in the conjunct polymer starting material which varies with the boiling point of the particular fraction selected for the process, and hence, the molecular weight of hydrocarbon components therein.

The reactant of the present copolymerization process referred to herein as a mixture of polyolefinic, cyclic hydrocarbons or unsaturated hydrocarbon conjunct polymers, is produced by a process known to the art as a conjunct polymerization reaction in which an unsaturated, non-aromatic hydrocarbon monomer containing at least three carbon atoms per molecule or a branched chair paraffinic hydrocarbon is contacted with a catalyst generally described as an acid-acting catalyst at reaction conditions suitable to effect the conjunct polymerization reaction. During the course of the reaction, a sludgelike product forms as one of the principal products of the conjunct polymerization containing substantially all of the catalyst initially charged to the reaction combined in the form of loosely bound addition complexes with the desired unsaturated conjunct hydrocarbon polymers. The latter hydrocarbons are recovered from the sludge by a special method of decomposing the hydrocarbon-catalyst complexes in the sludge as hereinafter described. Suitable unsaturated hydrocarbon charging stocks to the conjunct polymerization reaction comprise the mono-olefins (for example, propylene and its higher homologs), the polyolefins (such as butadiene, preferably in admixture with a suitable mono-olefin) and/or hydrocarbons containing acetylenic unsaturation, of either branched, straight or cyclic chain structure and said hydrocarbons may be charged either individually or in admixture with each other. Acid-acting or conjunct polymerization catalyst for the production of the desired unsaturated polymers are selected from the general class of substances referred to as Friedel-Crafts metal halides, and certain mineral acids. Of these general classes of catalysts utilizable in the conjunct polymerization reaction, anhydrous aluminum chloride and aluminum bromide as well as sulfuric acid and hydrofluoric acid containing less than about 10% by weight of water, (preferably the anhydrous acids) effect the conjunct polymerization reaction most expeditiously. The reaction is carried out by intimately admixing the hydrocarbon charging stock with the catalyst at temperatures of from about −30° to about 200° C., preferably at from about 0° to about 100° C., and at pressures sufficient to maintain the reaction mixture in substantially liquid phase. Optimum production of the desired sludge is obtained when the weight proportion of catalyst to hydrocarbon charging stock is from about 0.5 to about 2.5, but this proportion may be varied over a considerable range of values outside of the designated proportions to effect the production of the sludge, although not necessarily with equivalent yields. The products of the conjunct polymerization reaction are a sludge phase and an upper layer saturated hydrocarbon phase which separates from the sludge upon standing and may be removed therefrom, for example, by decantation.

The recovery of the unsaturated hydrocarbon conjunct polymers from its association with the catalyst in the form of the sludge may be effected by several alternative procedures, depending upon the catalyst utilized in the conjunct polymerization reaction. One of such methods which may be employed regardless of the particular conjunct polymerization catalyst utilized, consists of hydrolyzing the hydrocarbon-catalyst complexes contained in the sludge by thoroughly admixing the same with water, preferably maintained at a low temperature during the hydrolysis by the presence of an ice phase in the aqueous hydrolyzing medium. During the hydrolysis, the unsaturated conjunct hydrocarbon polymers associated with the catalyst in the sludge are released from this association and form a separate upper layer, while the water-soluble or chemically hydrated catalyst enters the lower aqueous phase.

An alternative sludge decomposition procedure, generally considered the most economical and the preferred method, utilizable when the catalyst to the conjunct polymerization reaction is the volatile hydrogen fluoride catalyst, is by means of thermal decomposition in which the sludge is heated until the hydrogen fluoride is vaporized therefrom. A product containing a greater degree of unsaturation is obtained when the sludge is thermally decomposed in the presence of a suitable catalyst which enhances the decomposition, suitable catalysts including metallic particles of lead, copper, cobalt, and certain brasses containing copper, lead, and tin particles of graphitic carbon and certain metallic fluoride and oxyfluoride salts.

Another modification of the thermal decomposition method comprises introducing the hydrogen fluoride sludge into a liquid paraffinic hydrocarbon maintained at a temperature in excess of the decomposition point of the sludge, generally at temperatures of from about 50° to about 200° C., or at the boiling point of the paraffinic hydrocarbon diluent, reflux of which provides the necessary heat of decomposition by contacting the reflux vapors from a suitable reboiler arrangement in the decomposition zone with the hydrogen fluoride sludge. The desired unsaturated hydrocarbon conjunct polymers are subsequently recovered from the mixture of diluent and polymers by fractionation, preferably at subatmospheric pressures.

The recovered polyolefinic, cyclic hydrocarbons or unsaturated conjunct polymers are cyclic, although substantially non-aromatic and have isolated unsaturation in addition to conjugated unsaturation. The hydrocarbons boil from about 150° to about 450° C., have bromine numbers above about 140, maleic anhydride values of from about 30 to about 90 and contain from about 2.5 to about 4.5 double bonds per molecule, of which from about 40 to about 70% are in conjugated relationship with each other.

The quantity of unsaturated hydrocarbon conjunct polymers charged to the copolymerization reaction mixture in accordance with the present process in general depends upon the molecular weight of the hydrocarbons so utilized and the degree of unsaturation desired in the ultimate copolymer product. Desirable resins having air-drying properties but not necessarily of equivalent drying capacity, may be formed by utilizing quantities of the unsaturated conjunct polymers of from about 5 to about 60% by weight of the reaction mixture, but preferably from about 15 to about 50% by weight thereof. Of the unsaturated components of the conjunct polymer hydrocarbon mixture boiling from about 150° to about 450° C., as recovered from the conjunct polymerization sludge, it is preferred in the present process to utilize the relatively high boiling ends of the entire mixture, for example, a fraction boiling from about 300° to about 425° C. The latter fraction contains relatively high molecular weight polyolefinic, cyclic hydrocarbons which have a greater total unsaturation than the hydrocarbon components of the lower boiling fractions of the entire mixture of conjunct polymers; they therefore yield a final copolymer product having greater unsaturation, and therefore a greater capacity to dry upon exposure to atmospheric oxygen.

The monomer reactant herein referred to as a vinyl aromatic compound which may be copolymerized with the unsaturated hydrocarbon conjunct polymers separately in an initial stage of the reaction or copolymerized initially with the unsaturated conjunct polymers and coumarone-indene fraction in one reaction stage include the mono-, or polycyclic aryl compounds having attached thereto one or more vinyl groups comprising the active, copolymerizable centers of the compound. Typical of such vinyl aromatic compounds utilizable in the reaction of the present process are, for example, styrene, divinylbenzene, in which the vinyl groups may be ortho-, meta-, or para- to each other; alpha-methylstyrene, vinylnaphthalene, divinylnaphthalene, alpha-methylvinylnaphthalene and other vinyl susbtituted aromatic compounds containing, in general, not more than two vinyl nuclear substituents in which the vinyl group may be substituted by not more than one methyl group. A variation in the properties of the ultimate resin may be effected by utilizing vinyl aromatic compounds in which other substituents may appear on the aromatic nucleus, but which do not interfere with the copolymerization of the compound with the other reactants charged to the copolymerization reaction. Such nuclear substituents may include halo, nitro, amino, hydroxyl, alkoxyl, carboxyl, carbonyl and alkyl groups on one or more of the aromatic nuclear positions. Typical of the vinyl aromatic compounds which may be substituted by other generally non-reactive groups are such compounds as o-, m-, or p-vinylphenol, vinylanisole, o-, m-, or p-chlorostyrene and others. The additional substituents on the aromatic nucleus of the vinyl compound, in general, modifies the melting point and solubility of the ultimate resin in various organic solvents.

The reactant herein designated as a coumarone-indene fraction is generally recovered from certain narrowly boiling fractions of cold tar distillates or naphthas, produced in by-product coke ovens or recovered from the liquid portion of the product of carbureted water-gas production. Coumarone and indene, such as the synthetically prepared monomers, may each be utilized separately in the reaction; if desired, especially when colorless, or light-colored copolymer resins are the desired product. Coal tar naphthas boiling from about 165° to about 200° C., containing coumarone, indene, various isomeric methylcoumarones, methylindene, and dimethylcoumarones are generally utilizable in the present process.

It is generally considered to be the ethylenic linkages contained in the structure of the various coumarone and indene compounds present in said coal tar naphthas that constitute the active centers of the copolymerization reaction involving said coumarone-indene compounds. It is generally preferable to treat the coal tar naphthas with a dilute acid followed by a base to remove various acidic and basic foreign or coloring materials normally occurring in such fractions, prior to their utilization in the present process.

The copolymerization reaction of the present process for the production of a resinous copolymer composition is effected by contacting a mixture of the monomers, that is, the unsaturated hydrocarbon conjunct polymers, the vinyl aromatic compound, and the coumarone-indene fraction in designated proportions, with an acid-acting condensation catalyst at temperatures of from about −20° C. to about 100° C., preferably from about 10° to about 75° C. The relative proportions of the various reactant monomers generally determines whether the ultimate copolymer product will have drying properties upon exposure thereof to atmospheric oxygen. In order to prepare a suitable resinous product by condensation of the reactants herein provided, the reaction mixture must contain from about 5 to about 65% by weight of the mixture of polyolefinic, cyclic hydrocarbons or unsaturated hydrocarbon conjunct polymers, preferably from about 20% to about 50% by weight of said polymers, from about 5 to about 40% by weight of the vinylaromatic compound, the remainder of the reaction mixture comprising the coumarone-indene fraction, preferably from about 10 to about 40% by weight thereof.

Suitable catalysts for effecting the copolymerization reaction comprise generally the acid-acting type catalysts and particularly the Friedel-Crafts metal halides and modified Friedel-Crafts metal halide catalysts. The preferred catalysts for the copolymerization reaction are the relatively mild-acting Friedel-Crafts metal halide salts, such as zinc chloride, ferric chloride, tin chloride, vanadium chloride, and others. One of the preferred classes of acid-acting type catalysts utilizable as the copolymerization catalyst of the present reaction includes the inorganic halide complex combinations in which the inorganic halide is combined in a molecular association with an organic compound. The latter organic compounds which form catalytic molecular association complexes with the inorganic Friedel-Crafts halides are generally selected from the organic oxygen-containing compounds, such as the ketones, the alcohols, the carboxylic acids, the ethers, the esters, the organic nitro compounds, and others generally known to be capable of combining with the metal halides to form said catalytic complexes. Particularly desirable complexes of the latter type include the boron trifluoride etherates, alcoholates and ketonates, the aluminum chloride alcoholates, the aluminum chloride and aluminum bromide ketonates, and the zinc chloride alcoholates. The catalyst is generally added to the mixture of copolymerizable monomers in amounts of from about 0.1% to about 10% by weight of the monomer reactants, depending upon the activity of the particular catalyst selected for the copolymerization reaction. The catalyst may be subsequently removed from the copolymer product by washing the latter with an insoluble organic solvent or water or by extracting the resin from the catalyst utilizing a solvent for the resin which is insoluble with the catalyst.

An alternative method of forming the present copolymer resinous composition comprises copolymerizing the unsaturated hydrocarbon conjunct polymers with either the vinyl aromatic compound or, preferably, with the coumarone-indene fraction in the presence of an acid-acting catalyst in an initial stage of the reaction and without separating the catalyst from the reaction mixture, adding thereto a quantity of the third component reactant and copolymerizing the resulting mixture at the conditions hereinabove specified. In this type of process, it is generally preferred to utilize a major proportion of the unsaturated conjunct polymers in the initial stage and thereafter complete the copolymerization with a minor amount of the subsequently added third component. The resulting product has a tendency to contain fewer unsaturated bonds than the product prepared by simultaneous copolymerization of the three-component reaction mixture.

The products of the present process have a widespread utility in various arts depending upon their physical properties. Since the compositions herein obtained generally have unsaturated linkages in their molecular structure, they may be incorporated into drying oils, and as such, are also subject to oxidative drying when exposed to atmospheric oxygen. This is particularly true of the liquid or semi-solid products obtained in the present process. When compounded with drying oils, the present resins form valuable varnishes in which the resinous component enhances the film-forming and bodying properties of paints and varnishes as well as oxidative drying types of printing inks in which the resins and their varnish compositions are incorporated.

The following examples are presented for the purpose of illustrating the present process in some of its specific applications, but should not be so construed as to restrict the generally broad scope of the invention, either as to reactant components or the reaction conditions specified in said examples.

Example I

A mixture of polyolefinic, cyclic hydrocarbons or unsaturated conjunct polymers was prepared by the reaction of a mono-olefinic hydrocarbon with liquefied hydrogen fluoride containing less than 1% water by weight to form a hydrogen fluoride-hydrocarbon sludge phase and relatively saturated upper layer hydrocarbon phase in accordance with the following procedure:

22 liters (16.5 kg.) of an olefinic, non-selective polymerization product containing from about 8 to about 12 carbon atoms per molecule, having a bromine number of 116, and consisting of the copolymers of mixed butylenes and propylene was charged into a pressure autoclave and rapidly stirred as 9.0 kg. of liquid hydrogen fluoride was introduced into the reactor. The pressure was maintained throughout the reaction at an average value of about 205 pounds per square inch by means of compressed nitrogen. The temperature was increased to 90° C. and stirring was continued for an additional hour. The reaction mixture separated into two phases on standing: an upper saturated hydrocarbon layer and a lower acidic sludge layer containing substantially all of the hydrogen fluoride charged into the reaction. The desired lower acidic sludge layer weighing 16.1 kg. and consisting of a light brown, mobile fluid.

5 kg. of the above hydrogen fluoride sludge was allowed to flow into a mixture of ice and water, additional ice being added as the heat of reaction melted the ice in the resulting hydrolytic reaction. 2.17 kg. of a light colored, sweet smelling oil separated from the aqueous phase, representing a yield of 42.2% based on the weight of the original olefins charged. Examination of the oil separating from the sludge in the hydrolytic reaction indicates that the material has the following properties:

| | |
|---|---|
| Boiling range, °C | 160 to about 400 |
| Density, $d_4^{20}$ | 0.863 |
| Refractive index, $n_D^{20}$ | 1.4871 |
| Molecular weight, average | 300 |
| Diene number | 85 |
| Bromine number | 195 |
| Double bonds per molecule, average | 3.2 |

Although the above mixture of conjunct polymers was prepared from a hydrogen fluoride sludge and was recovered therefrom by an aqueous hydrolytic procedure, a similar material may be obtained from a sludge formed in an aluminum chloride or sulfuric acid catalyzed conjunct polymerization reaction, and the conjunct hydrocarbon polymers may also be recovered from the hydrogen fluoride sludge by thermally decomposing the catalyst-hydrocarbon complexes contained in the sludge.

The mixture of unsaturated conjunct polymers prepared by the above procedure was fractionated to separate a fraction boiling from about 325° to about 400° C. for utilization as the polyolefinic, cyclic hydrocarbon monomer in the copolymerization reaction of this invention.

A viscous, substantially semi-solid resinous product was prepared by mixing together approximately 31.2 grams of the above separated 325-400° C. fraction of the unsaturated conjunct polymers with 31.6 grams of freshly distilled styrene and 33.7 grams of a crude coumarone-indene fraction containing approximately 60% coumarone. The reaction mixture was stirred and the temperature thereof maintained at from about 5° to about 15° C. as 1 gram (approximately 1% by weight of the reaction mixture) of a boron trifluoride-diethyl ether complex catalyst was added drop-wise to the reaction mixture over a period of approximately 5 minutes. The mixture was vigorously stirred for an additional 2½ hours at which time the mixture was an extremely viscous liquid. The product was washed with dilute sodium carbonate solution and distilled at approximately 10 mm. of mercury pressure to remove low boiling material therefrom. A semi-solid copolymer product was recovered as the residue of the distillation, amounting to approximately 80% by weight of the charged material.

The product when spread in a thin film and exposed to atmospheric oxygen on a test panel, dried to a dust-free condition, in less than one day, and to a hard, non-tacky film in approximately 24 hours, the film having a Sward hardness of 32.

The resinous product was soluble in various organic solvents, including unsaturated fatty acid ester drying oils, the composition therewith providing a desirable air drying varnish which is resistant to aqueous and alkali media, after drying on exposure to atmospheric oxygen.

Example II 30 grams of the 325-400° C. fraction separated from the unsaturated hydrocarbon products of a conjunct polymerization as described above was reacted with 31 grams of a coumarone-indene fraction at a temperature of from about 5 to about 15° C. for 1.5 hours in the presence of an aluminum chloride alcoholate catalyst. The reaction product, a brown, viscous liquid, and including the alcoholate catalyst, was then further reacted with 20 grams of freshly distilled styrene at 5 to about 15° C. for 1 hour. The reaction mixture was thereafter distilled at approximately 1 mm. mercury pressure to an end-point of about 20° C. About 80% of the mixture remained as a light-colored, semi-solid residue in the distillation flask. The residue had a molecular weight of about 700 and dried in about 24 hours on exposure to atmospheric oxygen to an adherent film having a Sward hardness of 32.

I claim as my invention:

1. A process for the production of a resinous copolymer composition which comprises reacting a mixture of unsaturated hydrocarbon conjunct polymers, recovered from an acid-acting catalyst-hydrocarbon complex formed in catalytic conjunct polymerization of hydrocarbons, with a vinyl aromatic compound and a coumarone-indene fraction in the presence of an acid-acting copolymerization catalyst, said conjunct polymers being polyolefinic, cyclic hydrocarbons boiling in the range of from about 150° to about 450° C. and having bromine numbers above about 140 and maleic anhydride values of from about 30 to about 90 and containing from about 2.5 to about 4.5 double bonds per molecule, of which from about 40% to about 70% are in conjugated relationship with each other.

2. The process of claim 1 further characterized in that the copolymerization reaction is effected at a temperature of from about −20° to about 100° C.

3. The process of claim 1 further characterized in that the reaction mixture contains from about 5 to about 65% by weight of said unsaturated conjunct polymers, from about 5% to about 40% by weight of said vinylaromatic compound and the remainder comprising said coumarone-indene fraction.

4. The process of claim 1 further characterized in that the reaction mixture contains from about 20 to about 50% by weight of said unsaturated conjunct polymers, from about 5 to about 40% by weight of said vinylaromatic compound and from about 10 to about 40% by weight of said coumarone-indene fraction.

5. The process of claim 1 further characterized in that said mixture of unsaturated conjunct polymers is a fraction boiling from about 300° to about 425° C.

6. The process of claim 1 further characterized in that said vinylaromatic compound is styrene.

7. The process of claim 1 further characterized in that said acid-acting copolymerization catalyst is a boron trifluoride diethyl ether complex.

8. A process for the production of a resinous copolymer composition which comprises reacting a mixture of unsaturated hydrocarbon conjunct polymers, recovered from an acid-acting catalyst-hydrocarbon complex formed in catalytic conjunct polymerization of hydrocarbons, with a coumarone-indene fraction in the presence of an acid-acting copolymerization catalyst and thereafter reacting the resultant mixture with a vinylaromatic compound, said conjunct polymers being polyolefinic, cyclic hydrocarbons boiling in the range of from about 150° to about 450° C. and having bromine numbers above about 140 and maleic anhydride values of from about 30 to about 90 and containing from about 2.5 to about 4.5 double bonds per molecule, of which from about 40% to about 70% are in conjugated relationship with each other.

9. The process of claim 8 further characterized in that said vinylaromatic compound is styrene.

10. As a composition of matter, the copolymer of a vinyl aromatic compound, a coumarone-indene fraction and a mixture of unsaturated hydrocarbon conjunct polymers recovered from an acid-acting catalyst-hydrocarbon complex formed in catalytic conjunct polymerization of hydrocarbons and comprising polyolefinic, cyclic hydrocarbons boiling in the range of from about 150° to about 450° C. and having bromine numbers above about 140 and maleic anhydride values of from about 30 to about 90 and containing from about 2.5 to about 4.5 double bonds per molecule, of which from about 40% to about 70% are in conjugated relationship with each other.

11. As a composition of matter, the copolymer of styrene, a coumarone-indene fraction and a mixture of unsaturated hydrocarbon conjunct polymers recovered from an acid-acting catalyst-hydrocarbon complex formed in catalytic conjunct polmerization of hydrocarbons and comprising polyolefinic, cyclic hydrocarbons boiling in the range of from about 150° to about 450° C. and having bromine numbers above about 140 and maleic anhydride values of from about 30 to about 90 and containing from about 2.5 to about 4.5 double bonds per molecule, of which from about 40% to about 70% are in conjugated relationship with each other.

EDWARD M. GEISER.

REFERENCES CITED

The following references are of record in the file of this patent:

UNITED STATES PATENTS

| Number | Name | Date |
|---|---|---|
| 2,140,506 | Canning | Dec. 20, 1938 |
| 2,217,988 | Lawson | Oct. 15, 1940 |
| 2,371,652 | Rostler | Mar. 20, 1945 |
| 2,460,692 | Gould | Feb. 1, 1949 |
| 2,523,926 | Sperberg | Sept. 26, 1950 |